Nov. 8, 1966   K. W. SCHROEDER   3,284,710
A.C. OR PULSATING D.C. INPUT SIGNAL CURRENT MEASURING
TRANSFORMER SYSTEM WITH TRANSFORMER OUTPUT RATIOS
CORRESPONDING TO THE INPUT SIGNAL
Filed July 3, 1962
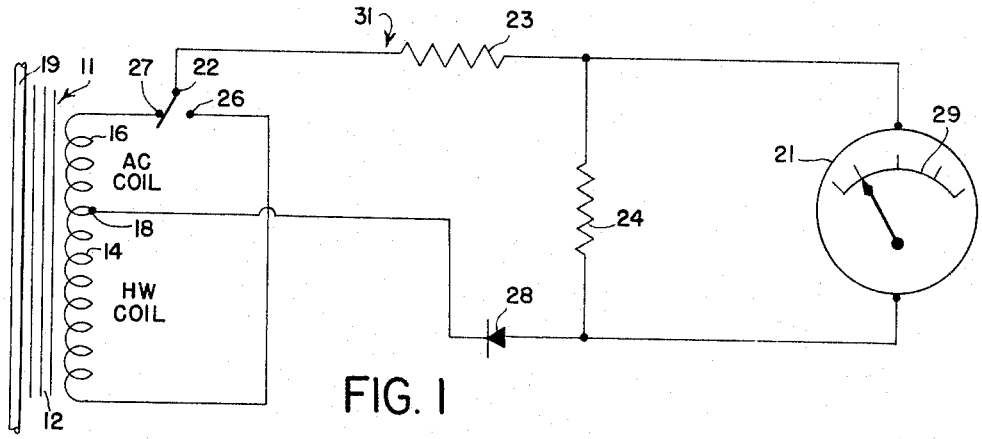
FIG. 1
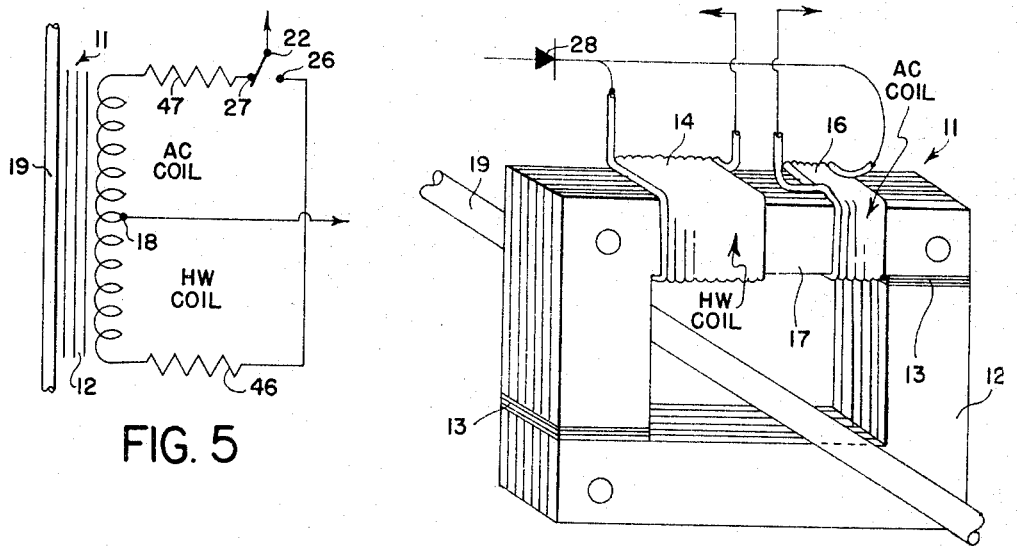
FIG. 5
FIG. 2
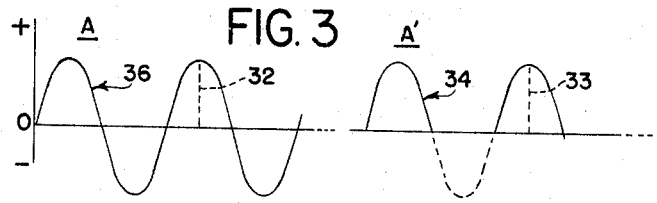
FIG. 3
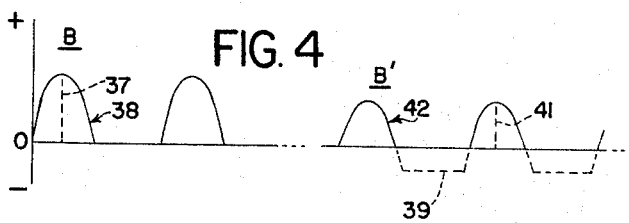
FIG. 4
INVENTOR.
KENNETH W. SCHROEDER
BY Harold D. Jastram
ATTORNEY

United States Patent Office 3,284,710
Patented Nov. 8, 1966

3,284,710
A.C. OR PULSATING D.C. INPUT SIGNAL CURRENT MEASURING TRANSFORMER SYSTEM WITH TRANSFORMER OUTPUT RATIOS CORRESPONDING TO THE INPUT SIGNAL
Kenneth W. Schroeder, Arlington Heights, Ill., assignor, by mesne assignments, to Magnaflux Corporation, a corporation of Delaware
Filed July 3, 1962, Ser. No. 207,216
2 Claims. (Cl. 324—127)

This invention relates to a measuring device and more particularly to a system for measuring high amperage current.

In the non-destructive testing field, high amperage currents are utilized to generate strong magnetic fields in test parts which are undergoing magnetic particle inspection so that faults in the test parts may be detected. These strong magnetic fields are distorted by any fault, break, or other discontinuity which may occur in a ferromagnetic test piece or section thereof such as a steel conduit, steel shaft or the like.

Finely divided magnetic particles are applied to the test piece and are attracted to the leakage fields caused by the fault or discontinuity. The buildup of these particles results in an indication which greatly aids in the visual location of the discontinuity. The test is commonly applied to welds, castings, forgings, and many ferromagnetic parts.

Depending upon the particular test being conducted and the nature of the fault which is being investigated, the current which is applied to the test piece or magnetizing coil to generate the magnetic field may either be alternating current (A.C.) or it may be direct current, such as unidirectional pulsating or half wave current (HW), of a suitable amperage magnitude. A.C. is used to refer to alternating current signals and HW is used to refer to half wave unidirectional or direct current signals. Often both high amperage A.C. and high amperage half wave currents are utilized during the test in order to detect particular faults which occur in the test piece. The use of these different types of currents results in a need for some type of current monitoring or measuring device which can be utilized to monitor both types of currents. Normally, when equipment has both high amperage A.C. and half wave (HW) output capabilities, two separate metering systems are required to monitor the particular output current being utilized. One meter, an A.C. meter, is utilized to monitor or measure the high amperage A.C. and a D.C. meter in conjunction with an appropriate external shunt is utilized to monitor or measure the half wave current.

The use of separate metering systems for measuring the different types of current naturally involves both a space and cost consideration. When equipment space is of prime concern, the normal use of multiple meters together with their associated components can be a definite disadvantage. The need for multiple meters and the associated components adds directly to the manufacturing cost of testing equipment. The additional installation time requirements also contributes toward raising the manufacturing cost.

It is an object of the present invention to provide a new and improved measuring device.

Another object of the present invention is to provide a new and improved current monitoring system.

A further object of the present invention is to provide a new and improved device for monitoring high amperage currents encountered in connection with non-destructive testing equipment.

A yet further object of the present invention is to provide a new and improved device for monitoring A.C. and pulsating currents with a single meter.

Another object of the present invention is to provide a new and improved system for monitoring high amperage A.C. and half wave currents encountered in non-destructive testing equipment by utilizing a single meter having a single calibrated meter scale which is used to monitor both types of current.

With these and other objects in view the present invention contemplates the use of a single meter in circuit with a rectifier and a coil selecting device. A coil, which is the secondary winding of a transformer or probe contains a center tap to divide the coil into an A.C. section for A.C. operation and a half wave section for HW operation. The selecting device changes or selects the coil, whether A.C. or half wave, which is placed in circuit with the meter and rectifier. The selecting device determines which type of current, being induced into the coil from a test piece or conductor, is measured or monitored by the meter or galvanometer.

A complete understanding of the invention may be obtained from the following detailed description of a method and an apparatus forming specific emmbodiments, when read in conjunction with the drawings in which:

FIGURE 1 is a circuit diagram in accordance with the present invention showing a transformer or probe, a diode, and a galvanometer;

FIGURE 2 is an isometric view of a transformer core having a pair of coils on one portion with a high amperage conductor in which current is to be measured extending through the window of the core;

FIGURE 3 shows the wave forms of A.C. current in a primary winding or high amperage conductor and a rectified form of the induced signal which flows through the galvanometer;

FIGURE 4 shows the wave form for half wave current in the primary winding and the rectified form of a signal induced in a secondary of a transformer, and FIGURE 5 is a circuit diagram showing an alternate embodiment of the transformer or probe shown in FIGURE 1.

The monitoring system consists essentially of three basic assemblies. These assemblies are a transformer or probe 11, a meter or galvanometer 21, and circuitry 31 interconnecting the meter with the transformer. Refer first to FIGURE 2 of the drawings where a transformer 11 is shown in an isometric view. Transformer 11 is a standard current transformer having a laminated core 12. Since the monitoring system which includes the transformer, is used to monitor currents of very high amperage, the core 12 of the transformer 11 is laminated to prevent excessive energy losses due to hysteresis and eddy currents. When a transformer is used with high amperage currents, as is the case in the present invention, the usual core 12 tends to saturate (especially prevalent with HW), thus preventing an accurate measurement or monitoring of the current by the meter or galvanometer 21. To prevent this saturation of transformer core 12, an air gap 13 is placed in one leg of the core 12. This air gap is actually filled with a material similar to stencil paper or the like. This air gap insures that the transformer core 12 will not saturate when very high amperage A.C. or half wave (HW) currents are picked up by the transformer from the test piece or a conductor carrying the current to the test piece or to a magnetizing device such as a coil.

A pair of coils 14 and 16 are wound on one leg 17 of the transformer core 12. These coils 14 and 16 may actually be a single coil with a tap 18 as shown in the schematic drawing in FIGURE 1. The coils 14 and 16 constitute the secondary winding of the transformer or probe 11. The primary of the transformer 11 is a high amperage carrying conductor 19 which carries the current to be measured, and is in the test piece electrical circuit. A source of high amperage current, not shown, is applied to the test piece or magnetizing coil so that a strong magnetic field is generated in and around the test piece. Flaws and similar faults in the test piece distort the magnetic field and provide a means for detecting and locating the fault. An example of such a testing method and means is illustrated in A. V. Deforest Patent Reissue 19,611, dated June 18, 1935 and in A. V. Deforest et al. Patent 2,158,409, dated May 16, 1939.

Thus, one of the conductors from the high amperage source is inserted through the window of transformer core 12 and acts as the primary for the transformer 11. Conductor 19 of FIGURE 2 is such a high amperage conductor. As noted in the above cited patents, the current which is carried by the high amperage conductor 19 may either be an A.C. current or it may be direct current. The pulsating direct current may be half wave rectified current which the present monitoring system is designed to alternately monitor in the place of A.C. current with no meter calibration or change of scale necessary.

Refer now to FIGURE 1 where the transformer 11 and associated coils are shown in circuit diagram with the meter 21 and interconnecting circuitry 31. A switch 22 is placed in the circuit so that the coil or section 14 and the coil or section 16 may be switched in and out of the circuit which contains the meter 21. When the switch 22 is contacting terminal 27 as shown in FIGURE 1, the A.C. coil 16 is in circuit with the meter 21. When the switch 22 is changed to terminal 26, the half wave coil 14 is in circuit with the meter 21. This switch 22 is necessary to provide a means for changing from coil 14 to coil 16 depending upon the type of current, whether A.C. or half wave, which is being used on the test piece and which is consequently flowing through high amperage conductor 19.

Resistor 23 and resistor 24 are in series with the transformer 18. Resistor 23 is a relatively large resistor, large with respect to resistor 24, and is used to limit the current flow in the system. Resistor 24 is the smaller of the two resistors and provides a shunt path around meter 21. The meter or galvanometer 21 has a single meter movement with a single scale 29.

Diode 28 is placed in the circuit so that only unidirectional pulsating or half wave current will flow in the monitoring system beyond the secondary coils 14 and 16. With the system connected in this manner, a single meter movement and a single scale 29 on meter 21 can be utilized to measure both half wave direct current and A.C. current which is picked up by the transformer 11 from the high amperage conductor 19.

The function of this system in a test set up such as that involved in the above-identified patents will now be described. Assume that high amperage A.C. current is being used to generate the magnetic field about a test piece which is not shown. This high amperage A.C. current flows through the conductor 19. This A.C. current flowing in conductor 19, illustrated by section A of FIGURE 3, is induced into coils 14 and 16, the secondaries of the transformer 11, by transformer action. This induced signal is an A.C. signal and induces an A.C. current in the coils 14 and 16. Coil sections 14 and 16 detect or sense the current flowing through conductor 19 and generate an alternating current signal or voltage across their respective terminals indicative of the current flowing in the conductor. Switch 22 is then moved to contact 27 so that the A.C. coil 16 is in the meter circuit. Under these conditions the half wave coil 14 is completely out of the meter circuit. Diode 28 which may be a conventional copper oxide rectifier or it may be an electronic diode, rectifies the A.C. current induced in the circuitry generally designated by the number 31 and produces a half wave direct current with a wave form as illustrated by section A' of FIGURE 3. The pulses 34 of the half wave rectified signal in section A' are the positive portion of the A.C. signal 36 with only a negligible change in the zero reference. Scale 29 is calibrated so that the desired range of half wave rectified A.C. current is measured by meter 21 and results in an indication of the A.C. current which is flowing in the high amperage conductor 19.

In a conventional monitoring system, a new meter 21, a D.C. meter with an external shunt and with an entirely different scale 29 is used to measure half wave direct current when half wave current is flowing in conductor 19 rather than A.C. current. One of the reasons a change of meters is apparently necessary is because when half wave current is flowing in the primary (conductor 19) an A.C. signal is induced in the secondary of a transformer which has a zero reference different from the zero reference of the original half wave current. This is assuming no saturation of the transformer 11. This is illustrated by the current wave forms in FIGURE 4. Section B of FIGURE 4 shows a conventional half wave current wave form having a peak amplitude 37. When the half wave current signal 38 induces an A.C. signal in the secondary of a transformer, the A.C. signal in the secondary has a wave form as shown in section B' of FIGURE 4. Line 39 was formerly the zero reference level of the half wave current signal. Assuming that the peak amplitudes 32 and 37 of A.C. and half wave currents in the primary are equal, the resulting induced A.C. signals in the secondary of the same transformer will have peak amplitudes 33 and 41 which are different. This change of zero reference or distortion occurs in the case where half wave current is flowing in the primary but does not occur as much when an A.C. current signal is flowing in the primary. The solid lines in sections A' and B' illustrate the rectified portions of the respective induced A.C. signals.

Also, when unidirectional current such as half wave is flowing in the primary, the transformer tends to saturate. This saturation results in a distortion of the signal induced in the secondary coils 14 and 16. This distortion often results in a change of the signal such as a change in period or a change in the peak amplitude, even though the primary half wave current is a sine wave. This distortion results in a different measurable rectified current value in circuit 31 than may occur when an A.C. signal is flowing in the primary (conductor 19).

Due to this amplitude change and distortion of the half wave signal, different meters are normally required to measure A.C. current signals and half wave current signals. In the present system, however, the measurement of half wave current which might be used on a test piece or in a magnetizing coil may be measured by simply changing the switch 22 from terminal 27 to terminal 26. When the switch 22 is connected to terminal 26, the half wave coil 14 of the transformer secondary is switched into the circuit with the meter 21.

When a half wave current signal 38 is flowing in the high amperage conductor 19 and through the test piece, an A.C. signal 42 is induced in coil 14 which may have a wave form similar to that shown in section B' of FIGURE 4. As noted, although the peak amplitude of the A.C. signal and the half wave signal in conductor 19 may be the same, the resultant induced A.C. signals in the secondary, coils 14 and 16, will be different for the A.C. current and the half wave current signals. This difference results since the transformer action, as noted, distorts the signals and produces different secondary wave forms. To compensate for this distortion, the coils 14 and 16 are wound with a different number of turns so that meter 21 will give an accurate reading of the current flow in the primary conductor 19. The coils 14 and 16 of the secondary of the transformer 11 are wound so that there is a fewer number of turns in the A.C. coil 16 than in the HW coil 14. With this compensation, the meter 21 gives a correct reading on the same scale for either type of current which may occur in the conductor 19. Switch 22 is merely operated to place coil 14 or 16 in the meter circuit depending on whether there is A.C. or half wave current flowing in conductor 19. Diode 28 rectifies the induced A.C. signals so that the positive portion of the induced A.C. signals, illustrated by solid lines in sections A' and B' of FIGURE 3 and 4 respectively, flows through the meter 21.

The exact number of coil turns or the ratio of the number of coil turns in the A.C. coil 16 to the number of turns in the HW coil 14 will vary and depend on a number of factors. It will depend on the extent of the distortion of the half wave current signal. The magnitude of this distortion of course is to a great extent dependent on the degree of saturation of the transformer 11. The nature of the primary current signals, whether a pure sine wave, square wave or the like, will also influence the extent of compensation needed in the secondary coils 14 and 16. These factors and others influence ratio of coil turns needed in coils 14 and 16 and the exact number can be determined by simply varying the number of turns in each testing or inspection situation so that an accurate reading of current flow in conductor 19 is obtained on meter 21.

Rather than compensate for the signal distortion by varying the number of turns in coils 14 and 16, resistors may be used to adjust the rectified current flow in the system 31. Refer to FIGURE 5. Tap 18 may be placed at the center of the primary winding of transformer 11. Resistors 46 and 47 are placed in circuit with coils 14 and 16 respectively. Resistors 46 and 47 are of different resistance values and compensate for the distortion which occurs when an A.C. signal is induced in coil 14 as a result of half way current flow in conductor 19. For instance, resistor 46 may have a smaller resistance value than resistor 47 to compensate for the signal distortion. Thus the rectified current flow in circuit 31 measured by meter 21 results in an accurate indication of the current magnitude flowing in conductor 19 whether the current flow is A.C. or unidirectional half wave. Switch 22 is used, as previously described, to select the appropriate coil 14 or 16.

Certain variations in the system can occur. For instance the air gap 13 in the transformer 11 may be altered, within limits, depending on the magnitude of current which is utilized for generating the magnetic field in the test piece. It is also to be understood that the above described arrangements are simply illustrative of the application of the principles of the invention. Numerous other arrangements may be readily devised by those skilled in the art which will embody the principles of the invention and fall within the spirit and scope thereof.

Now therefore I claim:

1. An electrical signal measuring system comprising an instrument transformer including first secondary winding means for detecting the presence of an alternating current signal in the transformer primary, and second secondary winding means for detecting the presence of a unidirectionally pulsating current signal in the primary, a series measuring circuit including a half-wave rectifier and meter, said series circuit being selectively connected across either of said secondary winding means, said meter having a single range and a corresponding single scale, one of said secondary winding means having a greater number of turns than the number of turns of the other secondary winding means, the ratio of turns of said secondary winding means to one another being such that output signals from each secondary winding means are equal when the magnitude of one-half cycle of the alternating current primary current is equal to the magnitude of one cycle of the unidirectionally pulsating primary current, whereby the value of alternating current primary current, or unidirectionally pulsating primary current is selectively indicated on the single scale of the meter by the same reading when the magnitude of one-half cycle of the alternating current primary current is equal to the magnitude of one cycle of the unidirectionally pulsating primary current.

2. An electrical signal measuring system comprising an instrument transformer including first secondary winding means for detecting the presence of an alternating current signal in the transformer primary and second secondary winding means for detecting the presence of a unidirectionally pulsating current signal in the primary, a series measuring circuit including a half-wave rectifier and meter, said series circuit being selectively connected across either of said secondary winding means, said meter having a single range and a corresponding single scale, each of said secondary winding means having an equal number of turns and each having a different value of resistance in series therewith, the ratio of resistance values of the resistors of said secondary winding means to one another being such that output signals from each secondary winding means are equal when the magnitude of one-half cycle of the alternating current primary current is equal to the magnitude of one cycle of the unidirectionally pulsating primary current, whereby the value of alternating current primary current or unidirectionally pulsating primary current is selectively indicated on the single scale of the meter by the same reading when the magnitude of one-half cycle of the alternating current primary current is equal to the magnitude of one cycle of the unidirectionally pulsating primary current.

References Cited by the Examiner

UNITED STATES PATENTS

| | | | |
|---|---|---|---|
| 1,800,474 | 4/1931 | Scherer | 324—127 |
| 2,686,898 | 8/1954 | Schweitzer | 324—127 |

WALTER L. CARLSON, *Primary Examiner.*

R. V. ROLINEC, *Assistant Examiner.*